(12) United States Patent
Patel (10) Patent No.: US 7,346,354 B2
(45) Date of Patent: Mar. 18, 2008

(54) METHOD AND SYSTEM FOR DYNAMIC SOFT HANDOFF RESOURCE ALLOCATION IN A WIRELESS NETWORK

(75) Inventor: Achal R. Patel, McKinney, TX (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 11/053,323

(22) Filed: Feb. 7, 2005

(65) Prior Publication Data

US 2005/0153697 A1    Jul. 14, 2005

Related U.S. Application Data

(63) Continuation of application No. 09/591,077, filed on Jun. 9, 2000, now Pat. No. 6,907,243.

(60) Provisional application No. 60/138,224, filed on Jun. 9, 1999.

(51) Int. Cl.
*H04Q 7/20* (2006.01)

(52) U.S. Cl. .................. 455/450; 455/451; 455/452.1; 455/453; 370/335

(58) Field of Classification Search ............... 370/335; 455/450, 452.1, 451, 453
See application file for complete search history.

(56) References Cited

U.S. PATENT DOCUMENTS

| | | | |
|---|---|---|---|
| 5,257,283 A | 10/1993 | Gilhousen et al. .............. 375/1 |
| 5,293,640 A | 3/1994 | Gunmar et al. ............ 455/33.1 |
| 5,301,359 A | 4/1994 | Van den Heuvel et al. 455/56.1 |
| 5,504,935 A * | 4/1996 | Vercauteren ................ 455/438 |
| 5,561,839 A | 10/1996 | Osterberg et al. .......... 455/33.1 |
| 5,574,983 A | 11/1996 | Douzono et al. ............. 455/69 |
| 5,586,170 A | 12/1996 | Lea ........................ 455/452.1 |
| 5,603,085 A | 2/1997 | Shedlo ...................... 455/33.1 |
| 5,666,356 A | 9/1997 | Fleming et al. ............. 370/328 |
| 5,734,967 A | 3/1998 | Kotzin et al. ................. 455/63 |
| 5,745,480 A | 4/1998 | Behtash et al. ............. 370/252 |
| 5,768,260 A | 6/1998 | Lindgren et al. ........... 370/252 |
| 5,771,451 A | 6/1998 | Takai et al. ................ 455/442 |

(Continued)

FOREIGN PATENT DOCUMENTS

EP    0 831 669 A2    3/1998

(Continued)

OTHER PUBLICATIONS

*Data Networks*, Bertsekas et al., 1987.

(Continued)

*Primary Examiner*—Rafael Perez-Gutierrez
*Assistant Examiner*—Charles Shedrick
(74) *Attorney, Agent, or Firm*—Baker Botts L.L.P.

(57) ABSTRACT

A method and system for dynamic soft handoff resource allocation in a wireless communications network includes determining a wireless path characteristic individually for each path of a macro diversity connection between a mobile device and a plurality of wireless sites. Wireless resources are allocated for the macro diversity connection between the mobile device and the wireless sites based on the wireless path characteristic. The wireless path characteristic includes a location-based characteristic, a congestion-based characteristic, a subscriber-based characteristic and/or a performance-based characteristic.

23 Claims, 6 Drawing Sheets

U.S. PATENT DOCUMENTS

| | | | | |
|---|---|---|---|---|
| 5,781,861 | A | * | 7/1998 | Kang et al. ................. 455/442 |
| 5,805,585 | A | | 9/1998 | Javitt et al. ................. 370/342 |
| 5,862,485 | A | | 1/1999 | Linneweh, Jr. et al. ..... 455/450 |
| 5,923,650 | A | | 7/1999 | Chen et al. ................. 370/331 |
| 5,933,777 | A | | 8/1999 | Rahman ..................... 455/450 |
| 5,946,621 | A | | 8/1999 | Chheda et al. .............. 455/440 |
| 5,974,318 | A | | 10/1999 | Satarasinghe .............. 455/436 |
| 5,987,326 | A | | 11/1999 | Tiedemann, Jr. et al. ... 370/331 |
| 5,995,805 | A | | 11/1999 | Ogasawara et al. ........ 455/13.1 |
| 6,018,662 | A | | 1/2000 | Periyalwar et al. ......... 455/442 |
| 6,021,309 | A | | 2/2000 | Sherman et al. ........... 455/12.1 |
| 6,069,883 | A | * | 5/2000 | Ejzak et al. ................ 370/335 |
| 6,070,084 | A | | 5/2000 | Hamabe ..................... 455/522 |
| 6,078,817 | A | | 6/2000 | Rahman ..................... 455/452 |
| 6,148,208 | A | | 11/2000 | Love .......................... 455/442 |
| 6,151,309 | A | | 11/2000 | Busuioc et al. ............. 370/328 |
| 6,151,502 | A | | 11/2000 | Padovani et al. ........... 455/442 |
| 6,157,668 | A | | 12/2000 | Gilhousen et al. .......... 375/130 |
| 6,167,255 | A | | 12/2000 | Kennedy et al. ............ 455/404 |
| 6,181,738 | B1 | | 1/2001 | Chheda et al. .............. 375/224 |
| 6,192,041 | B1 | | 2/2001 | Phillips ...................... 370/338 |
| 6,226,283 | B1 | | 5/2001 | Neumiller et al. .......... 370/340 |
| 6,246,877 | B1 | | 6/2001 | Frodigh et al. ............. 455/436 |
| 6,289,005 | B1 | | 9/2001 | Katz .......................... 370/328 |
| 6,304,562 | B1 | | 10/2001 | Kim et al. ................... 370/332 |
| 6,324,185 | B1 | | 11/2001 | Budhraja .................... 370/468 |
| 6,327,254 | B1 | | 12/2001 | Chuah ........................ 370/328 |
| 6,347,224 | B1 | | 2/2002 | Smyth et al. ............... 455/406 |
| 6,351,642 | B1 | | 2/2002 | Corbett et al. .............. 455/442 |
| 6,370,399 | B1 | | 4/2002 | Phillips ...................... 370/442 |
| 6,381,458 | B1 | | 4/2002 | Frodigh et al. ............. 455/442 |
| 6,400,953 | B1 | | 6/2002 | Furukawa ................... 455/442 |
| 6,452,917 | B1 | | 9/2002 | Leung ........................ 370/342 |
| 6,477,155 | B1 | | 11/2002 | You ........................... 370/331 |
| 6,487,191 | B1 | | 11/2002 | Kang et al. ................. 370/342 |

FOREIGN PATENT DOCUMENTS

| | | |
|---|---|---|
| EP | 0 841 763 A1 | 5/1998 |
| EP | 1 041 850 A1 | 10/2000 |
| WO | WO 98/45966 | 10/1998 |
| WO | WO 98/52288 | 11/1998 |
| WO | WO 99/53630 | 10/1999 |

OTHER PUBLICATIONS

"On the Capacity of a Cellular CDMA Systems," Gilhousen et al., *IEEE* 1991, 10 pages.

"Erland Capacity of a Power Controlled CDMA System," Viterbi et al., *IEEE* 1993, 9 pages.

B. Bakshi, et al., "Improving Performance of TCP over Wireless Networks," IEEE 17th International Conference on Distributed Computing Systems, 10 pages, May 1997.

Timothy Ju and Gary Ogasawara, "Congestion Control By Traffic Shaping for Ground/Satellite Network," XP-002140800, Milcom '97 Proceedings, Nov. 2-5, 1997, 5 pages.

U.S. Appl. No. 09/174,273, entitled "Method and Apparatus for Class Based Transmission Control for Data Connections Based on Real-Time External Feedback Estimates Obtained Using Messaging from a Wireless Network," filed Oct. 16, 1998, 35 pages. (062891. 0476).

S. Biaz and N. Vaidya, "Discriminating Congestion Losses from Wireless Losses using Inter-Arrival Times at the Receiver," IEEE Symposium Application-Specific Systems and Software Engineering Technology (ASSET), 8 pages, Mar. 1999.

G. Holland and N.H. Vaidya, "Analysis of TCP Performance over Mobile Ad Hoc Networks," Fifth Annual ACM/IEEE International Conference on Mobile Computing and Networking (MOBICOM), 13 pages, Aug. 1999.

G. Holland and N.H. Vaidya, "Impact of Routing and Link Layers on TCP Performance in Mobile Ad Hoc Networks," IEEE Wireless Communications and Networking and Conference (WCNC), 5 pages, Oct. 1999.

U.S. Appl. No. 09/466,308, entitled "Method and System for Allocating Bandwidth in a Wireless Communications Network," filed Dec. 17, 1999, 85 pages. (062891.0475).

U.S. Appl. No. 09/513,914, entitled "Wireless Router and Method for Processing Traffic in a Wireless Communications Network," filed Feb. 25, 2000, 87 pages. (062891.0479).

U.S. Appl. No. 09/513,913, entitled "Method and System for Managing Transmission Resources in a Wireless Communications Network" filed Feb. 25, 2000, 73 pages. (062891.0474).

U.S. Appl. No. 09/513,090, entitled "Method and System for Configuring Wireless Routers and Networks," filed Feb. 25, 2000, 94 pages. (062891.0481).

U.S. Appl. No. 09/513,592, entitled "Method and System for Brokering Bandwidth in a Wireless Communications Network," filed Feb. 25, 2000, 50 pages. (062891.0478).

U.S. Appl. No. 09/513,912, entitled "Method and System for Queuing Traffic in a Wireless Communications Network," filed Feb. 25, 2000, 94 pages. (062891.0477).

CA*net II Differentiated Services. Bandwidth Broker System Specification, British Columbia Institute of Technology, Technology Centre, Group for Advanced Information Technology, http://www.interrnet2.edu/qos/gbone/QB BAC.shtml, Online Oct. 4, 1998, XP-002136418, 13 pages, Apr. 25, 2000.

U.S. Appl. No. 09/908,225, entitled "Method and System of Integrated Rate Control for a Traffic Flow Across Wireline and Wireless Networks," filed Jul. 18, 2001, 32 pages. (062891.0480).

"TCP and Explicit Congestion Notification," Floyd, Lawrence Berkeley laboratory, DE-AC03-76SF00098, 16 pages.

* cited by examiner

200 — RECEIVE REQUEST FOR CELL SITE RESOURCES FOR MOBILE SOFT HANDOFF

202 — DETERMINE CHARACTERISTICS FOR PATHS BETWEEN MOBILE AND CELL SITES

204 — ALLOCATE CELL SITE RESOURCES BASED ON PATH CHARACTERISTICS

FIG. 5

250 — DETERMINE LOCATION-BASED CHARACTERISTICS FOR PATHS

252 — DETERMINE CONGESTION-BASED CHARACTERISTICS FOR PATHS

254 — DETERMINE SUBSCRIPTION-BASED CHARACTERISTICS FOR PATHS

256 — DETERMINE PERFORMANCE-BASED CHARACTERISTICS FOR PATHS

METHOD AND SYSTEM FOR DYNAMIC SOFT HANDOFF RESOURCE ALLOCATION IN A WIRELESS NETWORK

RELATED APPLICATIONS

This application is a continuation of U.S. application Ser. No. 09/591,077 filed Jun. 9, 2000 now U.S. Pat. No. 6,907,243 and entitled "Method and System for Dynamic Soft Handoff Resource Allocation in a Wireless Network" by Achal R. Patel.

This application claims the benefit of U.S. Provisional Patent Application Ser. No. 60/138,224 entitled "Method and Apparatus for Quality of Service (QoS) and Air Congestion Based Resource Allocation for Packet Delivery Wireless Networks" filed Jun. 9, 1999, and which is hereby incorporated by inference.

TECHNICAL FIELD OF THE INVENTION

The present invention relates generally to the field of wireless communications, and more particularly to an improved method and system for dynamic soft hand off resource allocation in a wireless network.

BACKGROUND OF THE INVENTION

Wireline and wireless Internet Protocol (IP) networks have traditionally supported a best effort delivery of all traffic. However, current networks are optimized for real-time voice services, despite the growing need for data services. Furthermore, the constraints imposed by voice and data traffic on the system are quite different. Voice transmissions must be in real time and are intolerant to delays. Large delays in the transmission of voice packets significantly reduce the quality of the voice link. Also, network Grade of Service (GoS) requirements, such as probability of call blocking or outage and area reliability, as well as the treatment offered to all mobile voice users is the same. On the other hand, many data applications are tolerant to reasonable delays without significantly impacting the link and application quality. Thus, quality of service requirements and the treatment required by different data applications are dissimilar.

To support enhanced services, multiple types, or classes, of services have been established and assigned certain quality of service (QoS) parameters that manage queues for each service type. The QoS parameters include delay, jitter, error rates, and throughput. The QoS parameters can be provisioned on a per Internet Protocol (IP) connection or per flow basis through mechanisms such as resource reservation protocol (RSVP) or can be provisioned on aggregate flow, which is classified into service classes. Internet service providers (ISPs) can utilize the service classes, their associated QoS behavior, and QoS provisioning to provide multiple service offerings to their business and consumer customers.

As newer classes of services, with differing QoS requirements and different transmission characteristics are offered, it becomes imperative for wireless carriers to find new methods and techniques to optimally utilize limited air-bandwidth without affecting the overall network GoS. One attempt to ensure continual coverage, and thereby maintain QoS, is the "soft handoff." In modern wireless networks, Code-Division Multiple Access (CDMA) technology is used to shares frequency across multiple users and applications. CDMA supports a soft handoff, in which a mobile user is communicating with a mobile switching center via two or more cellular antennae sites and the user data is broadcast by all sites to the mobile user. This mode of communication makes the mobile-to-cell link resilient to obstructions in the beam path that can cause the active call to terminate abruptly. For the mobile to drop a call, the paths to all of the cells would have to be obstructed. A greater number of active links between the mobile and the network lowers the probability of dropping a call.

But, a mobile unit in soft handoff will cause all sites in handoff to transmit over a forward link to the mobile unit. This forward transmission from multiple sites to a single mobile unit, while improving the communication link to that particular mobile unit, increases the overall interference for other active mobile units in the system and can potentially degrade the performance of the forward link for all mobile units. Also, as the total forward power is limited, the available power for new users is considerably reduced. If several mobile units are in soft handoff at the same time, this can potentially lead to severe degradation in the overall system capacity.

SUMMARY OF THE INVENTION

The present invention provides an improved method and system for dynamic soft handoff and other macro diversity resource allocation in a wireless communications network that substantially eliminate or reduce problems and disadvantages associated with previous methods and systems. In particular, mobile users are characterized based on their relative impact on the network to manage the forward link interference caused by the mobile users in the soft handoff.

In accordance with one embodiment of the present invention, a method and system for allocating resources in a wireless network for macro diversity connections includes determining individual wireless path characteristics for each path of the macro diversity connection between a mobile device and a plurality of wireless sites. Wireless resources for the macro diversity connection are allocated between the mobile device and the wireless sites based on the wireless path characteristics.

The wireless path characteristics comprise location-based characteristics, interference-based characteristics, subscription-based characteristics and/or performance-based characteristics. The location-based characteristics include the location of the device along with related statistical information that allow the minimum resources needed from each site to meet subscriptions requirements to be determined. The interference-based characteristics include available bandwidth that allows intelligent allocation of resources to reduce air congestion and improved system capacity. The subscription-based characteristics include Quality of Service (QoS) that allow a fair distribution of resource in which higher level subscribers are provided more resources than lower level subscribers. The performance-based characteristics include real-time performance parameters to minimize redundancy and resource allocation.

Technical advantages of the present invention include providing an improved method and system for dynamic soft handoff and other macro diversity resource allocation in a wireless communications network. In particular, the active sets of mobile units communicating over wireless networks are biased to vary the resources allocated to a particular mobile unit. The bias values may be determined based on the geographic location (geo-location) of the mobile units, air congestion on the network, QoS subscriptions, link performance data, or any suitable combination of the above. This dynamic resource allocation for data/IP packet delivery over an air interface improves system capacity and allows for differentiated service provisions among mobile users. Moreover, management of system capacity among users and applications with differentiated service requests is improved.

Another technical advantage of the present invention includes providing an improved method and system for dynamic, location-based soft handoff resource allocation in a wireless communications network. In particular, the active sets of mobile units on the network are biased according to the geo-location of the mobile units relative to the location of neighboring servers. Thus, real time RF performance parameters and geo-location measurements of a mobile unit, along with historical data and adaptive capacity estimation techniques are used to compute dynamic resource allocation biases. Therefore, mobile unit servers that are not adding tangible value to the quality of the communications may be removed from communication with a mobile unit, thereby allowing allocation of those resources to other mobile units.

Yet another technical advantage of the present invention includes providing an improved method and system for dynamic, congestion-based soft handoff resource allocation in a wireless communications network. In particular, the active sets of mobile units on the network are biased according to the available power of the individual servers and the minimal requirements of each mobile unit. As a result, the dynamic resource allocation biases minimize air-link congestion in wireless multi-media networks.

Yet another technical advantage of the present invention includes providing a method and system for dynamic, subscription-based soft handoff resource allocation in a wireless communications network. In particular, the active sets of mobile units on the network are biased according to the level of quality subscription for each mobile user. Multiple service types may be different quality of service (QoS) classes such as premium, assured, and best effort. Thus, dynamic allocation of resources allows use of QoS subscriptions and requirements of mobile users and applications to compute dynamic resource allocation biases and allocate resources fairly. Furthermore, a user who has subscribed to a higher level of service is provided with more resources than a user who has subscribed to a lower level of service.

Still another technical advantage of the present invention includes providing a method and system for dynamic, performance-based soft handoff resource allocation in a wireless communications network. In particular, the active sets of mobile units on the network are biased according to the measured performance data of a current wireless link. Thus, a network operator may maximize efficiency in resources by estimating redundancy in resource allocation and minimizing that redundancy.

Yet another technical advantage of the present invention includes providing intelligent control for resource allocation. In particular, the network operator can manage the forward link interference caused by the plurality of mobile users in a soft handoff configuration. The mobile users can be characterized based on their relative impact on the network by considering the loading in the neighboring sectors, QoS subscriptions and the geo-location of all active mobile units in the neighboring sectors. Resource allocation can be controlled by generating tiered active sets that will minimize the interference and maintain the subscribed QoS for all users. Thus, network operators are assisted in effectively managing the air bandwidth, and thereby the congestion in heavily loaded portions of the network while providing fair and equitable quality of service to mobile users with varied QoS subscriptions and requirements.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
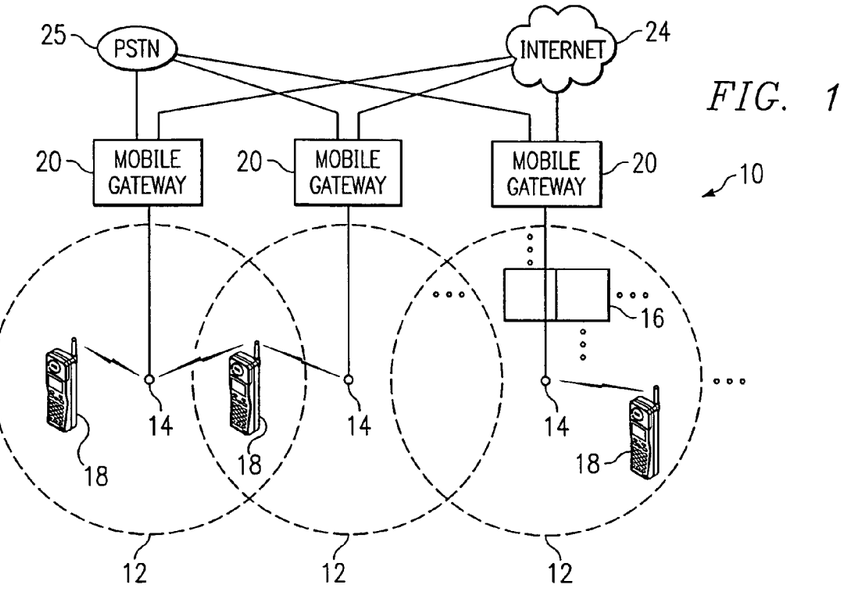
FIG. 1 is a block diagram illustrating a wireless network in accordance with one embodiment of the present invention.

FIG. 1 illustrates a wireless network 10 in accordance with one embodiment of the present invention. In this embodiment, the wireless network 10 is a cellular network in which terrestrial wireless transmission originates in geographically delimited cells. It will be understood that the present invention may be used in connection with satellite and other suitable wireless and other dynamic bandwidth networks.

Referring to FIG. 1, the wireless network 10 covers a contiguous area that is broken down into a series of overlapping wireless sites such as cells 12. Each cell 12 has a base station, or server, 14 and may be subdivided into a plurality of geographic location (geo-location) areas 16. The geo-location areas 16 are each a defined area in which bandwidth may be allocated to mobile devices. The geo-location areas 16 may have a resolution greater than, less than, or equal to cell size. In a particular embodiment, the geo-location areas 16 are substantially square in shape to form a contiguous grid over the coverage area. Thus, the geo-locations 16 may be shared by one or more cells 12. Further information regarding the geo-location is described in co-owned U.S. patent application Ser. No. 09/466,308, titled Method and System for Allocating Bandwidth in a Wireless Communications Network, filed Dec. 17, 1999, and incorporated herein by reference.

Each server 14 provides a radio frequency (RF) link for mobile devices 18 within its cell 12. The wireless RF link to the mobile devices 18 in the cell 12 may be based on established standards such as IS-54 (TDMA), IS-95 (CDMA), GMS and AMPS, 802.11 based WLAN, or new upcoming standards such as CDMA 2000 and W-CDMA, or proprietary radio interfaces. The mobile devices 18 may be cell phones, data phones, data devices, portable computers, or any other suitable device capable of communicating information over a wireless link.

Due to the nature of the RF airlink, the interference generated by the usage of various mobile devices 18 is inter-dependent. That-is, the interference generated by the usage of a mobile device 18 including transmitting and receiving signals is not only dependent on its geo-location, but is also dependent on the geo-location of surrounding mobile devices 18 and the usage of those devices. Thus, the cellular network is an inherently interference-limited network with bandwidth usage in a particular location impacting the interference in specific areas of the neighborhood. In the complete spectrum sharing systems such as CDMA and W-CDMA, bandwidth usage in a particular area directly impacts the bandwidth available at different locations in the neighborhood.

The servers 14 each have a defined bandwidth with which to communicate with the mobile devices 18 in the cells 12. The bandwidth is used by the server 14 and the mobile devices 18 to communicate voice and data information. The supported bandwidth is a function of various factors such as frequency reuse, carrier to interface ratio, bit-energy to noise ratio, effective bit-rate per connection and the like. As described in more detail below, the bandwidth available to allocate to certain flows is geo-location dependent, and time dependent based on current usage of other flows in the geo-neighborhood.

The servers 14 are each connected to a mobile gateway 20 that allocates bandwidth within the wireless network 10, routes traffic, and tracts the location of the mobile devices 18 in the cells 12. The position of a mobile device 18 may be determined using network-assist, global position systems (GPS), and radio frequency fingerprinting. Preferably, the positioning technique provides fast and accurate information with respect to the location of the mobile device 18 to minimize acquisition time for position information. As mobile users move from cell 12 to cell 12, a handoff operation between base stations 14 is performed by the mobile gateway 20.

The mobile gateway 20 provides connectivity from the wireless portion of the network 10 to a wireline portion 24 of the network 10 via circuit switched and packet switch wireless data protocols. The wireline portion 24 may be the Internet, intranet, extranet, or other suitable local or wide area network. For the Internet, the mobile gateway 20 provides an access, or entry point for all transport control protocol/Internet protocol (TCP/IP) data connections to the wireless portion of the network 10. The mobile gateway 20 also provides connectivity from the wireless portion of the network 10 to a wireline portion 25 of the network 10 via circuit switched and packet switch wireless data protocols. The wireline portion 25 may be a Public Switched Telephone Network (PSTN), Integrated Services Digital Network (ISDN), broadband integrated services digital network (B-ISDN), fiber distributed data interface (FDDI), or other suitable local or wide area network.

Each mobile gateway 20 may serve one or more servers 14, include the RF front end and other functionality of a server 14, and/or may be a wireless router as described in co-owned U.S. patent application Ser. No. 09/513,914 titled Wireless Router and Method for Processing Traffic in a Wireless Communications Network, filed Feb. 25, 2000, and incorporated herein by reference. In the later case, the wireless router may be self-configuring as described in co-owned. U.S. patent application Ser. No. 09/513,090, titled Method and System for Configuring Wireless Routers and Networks, filed Feb. 25, 2000, and incorporated herein by reference. Bandwidth allocation and other functionality of the mobile gateways 20 may instead be implemented by a mobile switching center (MSC), data interworking function (IWF) devices, and other suitable network devices without departing from the scope of the present invention.

Figure 2:
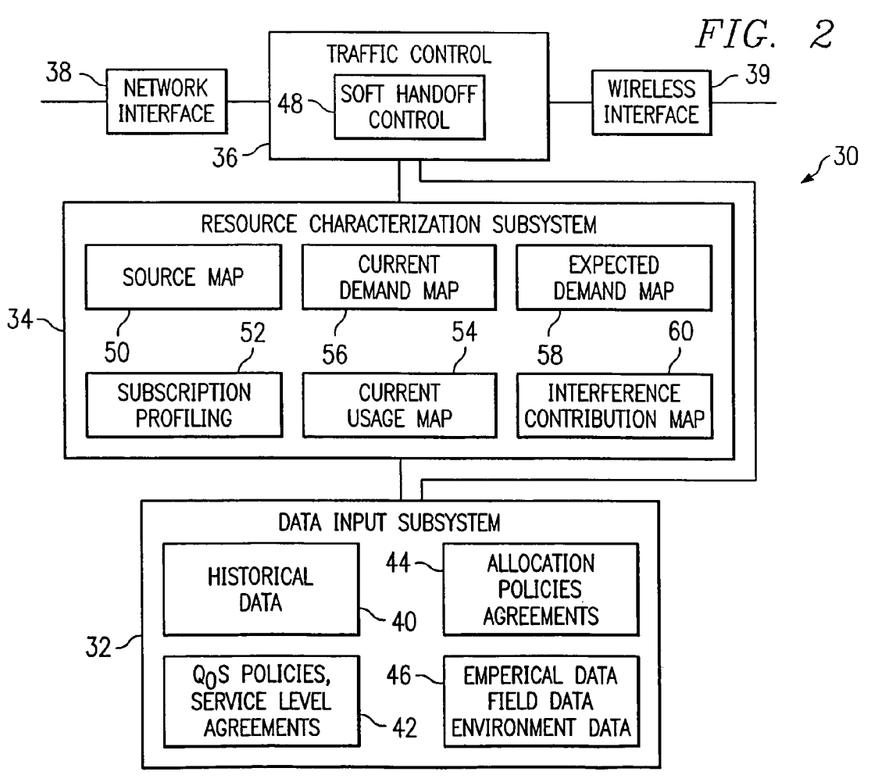
FIG. 2 is a block diagram illustrating details of the mobile gateway of FIG. 1 in accordance with one embodiment of the present invention.

FIG. 2 illustrates details of the mobile gateway 20 for the wireless network 10 in accordance with one embodiment of the present invention. In this embodiment, the mobile gateway 20 comprises logic stored on computer-processable media. The logic may comprise software stored on the computer-readable medium, or hardware encoded in application specific integrated circuits (ASIC), field programmable gate arrays (FPGA) and the like. The software includes programs, modules, functions, database tables and entries, data, routines, data storage, and other suitable elements that may operate in the mobile gateway 20 or be distributed between components of the wireless network 10. As described in more detail below, the mobile gateway 20 combines geo-location information with a dynamic bandwidth allocation and queue management mechanism to deliver location-specific bandwidth efficiently and cost-effectively.

Referring to FIG. 2, the mobile gateway 20 includes a data input subsystem 32, a resource characterization subsystem 34 that uses data from the input subsystem 32 to generate maps, profiles, and other geo-location specific tools, a traffic control subsystem 36 that uses the tools and information generated by the resource characterization subsystem 34 to implement allocation and scheduling of wireless traffic in the wireless network 10 and controls traffic between a network interface 38 and a wireless interface 39. The data input, resource characterization, and traffic control subsystems 32, 34, and 36 combine geo-location information with a dynamic bandwidth allocation and queue management mechanism to deliver location-specific bandwidth efficiently and cost-effectively.

The data input subsystem 32 provides historical, empirical, field, environmental, statistical, and other suitable data on or related to the operation of the wireless network 10 or components within the wireless network 10 that can be used to estimate bandwidth demand, use, and interference within the wireless network 10. In one embodiment, the data input subsystem 32 includes historical data 40, QoS policies and service level agreement information 42, allocation policy agreement information 44 and empirical, field, and environmental data 46. The historical data 40 provides historical performance data on the operation of the wireless network 10. The historical data 40 is connection data gathered from a switch, router, or other component external to and/or within the wireless network 10. The historical data 40 may include for each connection a time of day, call/service type, location, time until move or change in location, and completion time.

The QoS policies and service level agreement information 42 provides information on service level agreements and QoS policies of the business and consumers for the wireless network 10. The allocation policy agreement information 44 provides allocations policies and agreements for the wireless network 10. Provision of the policies and agreement information 42 and 44 allows contractual obligations to be accounted in allocated bandwidth within the wireless network 10.

The empirical, field, and environmental data 46 provides information that may be used along with historical data 40 to allocate bandwidth within the wireless network 10. In one embodiment, the empirical, field, and environmental data 46 includes empirical data per service type, location-specific RF measurements, and location-specific interference estimates. The empirical, field, and environmental data may be taken from measurements within the wireless network 10, other suitable components internal and/or external to the wireless network 10, or treatises and statistical information available for wireless networks.

The resource characterization subsystem 34 processes input data to determine current and/or expected location-specific bandwidth demand and/or use. In the illustrated embodiment, the resource allocation subsystem 34 provides maps and profiles that are used to determine allocation and/or scheduling of traffic in the wireless network 10. The maps may be graphical maps, database entries indexing the relevant information, and/or other suitable representations of the data. In one embodiment, the resource allocation subsystem 34 includes a source map 50, a subscriber profile 52, a current usage map 54, a current demand map 56, an expected demand map 58, and an interference contribution map 60. In this embodiment, resource allocation subsystem 34 utilizes some or all of the profiles and maps to allocate traffic on a per location and per class basis.

The source map 50 characterizes bandwidth sources within a geo-location area across time. The subscriber profiling 52 provides a profile as to each subscriber's location, likelihood, or probability of mobility and handoffs, likelihood of call hold time, class of service and vocation, and the like. The current usage map 54 indicates the current usage and performance at specific geo-location areas. The current demand map 56 indicates the resource request at various geo-location areas at the current time. The expected demand map 58 projects the expected resource request for a specified time in the future. The expected demand map 58 may be generated from the source map 50, subscriber profile 52, and the current demand map 56. The interference contribution map 60 maintains data on the probability of interference contribution to one or more servers 14 and the value of interference contribution to the one or more servers 14.

The traffic control subsystem 36 allocates bandwidth on a per flow, or per connection basis based on maps and profiles generated by the resource characterization subsystem 34 and data generated by data input subsystem 32, as well as other available data. Accordingly, bandwidth is allocated on a per class and per location basis. The traffic control subsystem 36 includes a soft handoff controller 48. As described in more detail below, the soft handoff controller 48 directs and regulates servers 14 and determines primary service status, soft handoff functionality, and power output for one or more servers 14.

Figure 3:
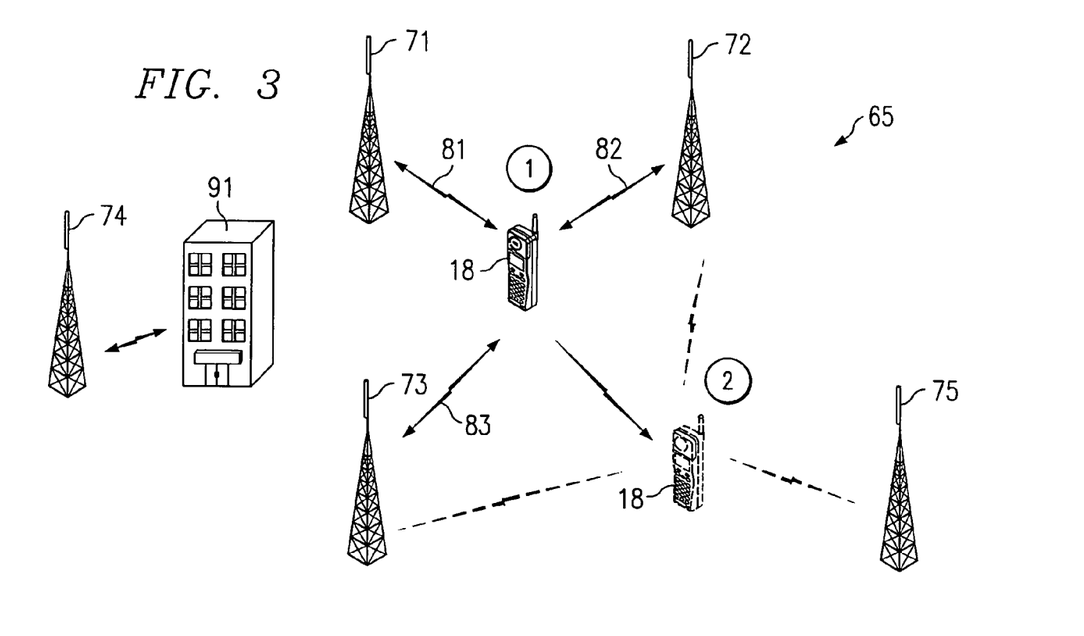
FIG. 3 is a graphical diagram illustrating soft handoff for a mobile device in accordance with one embodiment of the present invention.

FIG. 3 illustrates a mobile unit in a soft handoff configuration in accordance with one embodiment of the present invention. In this embodiment, the soft handoff configuration 65 includes servers 71, 72, 73, 74, and 75. The servers 71-75 may be mobile base stations, antennae, cell sites, cellular stations or other suitable servers operable to communicate with a mobile unit 18. It will be understood that the soft handoff configuration 65 may include any number of additional servers, to cover additional surface area and greater mobility within the wireless network 10.

Referring to FIG. 3, a mobile unit 18 is in soft handoff, communicating with servers 71, 72, and 73 over wireless links 81, 82, and 83 at geo-location (1). The mobile unit 18 communicates with the mobile switching center via all three of the servers 71, 72, and 73 while at position (1). Mobile unit 18 tracks the number of servers 14 with which it is communicating through a list or active set. In the illustrated example, the active set mobile unit 18 at geo-location (1) is {71, 72, 73}. Mobile unit 18 periodically updates the active set by measuring the strength of the signals from the neighboring servers 14.

The active set of mobile unit 18 is dependent on its geo-location and the distance to neighboring servers, as well as signal strength at a particular geo-location. For example, at geo-location (1), mobile unit 18 will be unable to receive high quality transmissions from server 74 because of the presence of obstruction 91 in the path between mobile unit 18 and server 74. As described in more detail below, resource allocation is controlled based on characteristics of the wireless paths. In a particular embodiment, a tiered active set is generated that minimizes the interference and maintains the subscribed QoS for all users. In the illustrated embodiment, the tiered active set prevents mobile unit 18 from including server 74 in its active set, or reducing the power allocation to zero. Thus, the resources of server 74 may be used for other mobile units in the network 10.

As mentioned above, the geo-location of mobile unit 18 is important in generating the active set. For example, as mobile unit 18 moves from geo-location (1) to geo-location (2), the soft handoff configuration will ensure that the active set is updated to reflect the change in geo-location. In the illustrated example, the active set of mobile unit 18 would change from {71, 72, 73} to {72, 73, 75}.

Figure 4:
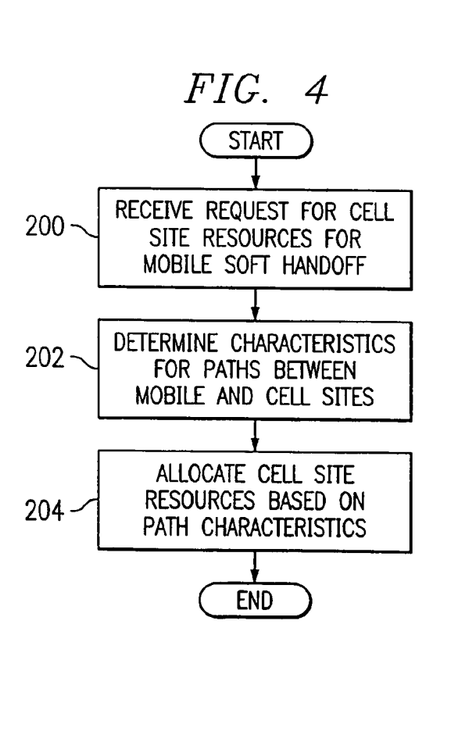
FIG. 4 is a flow diagram illustrating a method for allocating resources for a soft handoff connection in accordance with one embodiment of the present invention.

FIG. 4 illustrates a method for allocating wireless resources for a soft handoff or other macro diversity connection in a wireless network in accordance with one embodiment of the present invention. In this embodiment, the connection is a CDMA, CDMA 2000, W-CDMA or other suitable soft handoff between the mobile device 18 and cell sites 12. The wireless resources are transmission resources including transmission power and transmission bandwidth which are proportional to one another.

Referring to FIG. 4, the method begins at step 200 in which a request is received for cell site resources for mobile soft handoff. In the CDMA embodiment, the request for cell site resources includes an active set of cells 12 and a transmission bandwidth for the cells 12. The active set and transmission bandwidth are generated by the mobile device 18 upon initiating a connection to the wireless network 10.

Proceeding to step 202, wireless path characteristics are determined for each path between the mobile device 18 and the cell 12. The wireless paths are characterized based on their actual or relative interference impact on the network 10 including the cell 12 in a region of the mobile device 18, neighboring cell 12, and/or other mobile devices 18. The path characteristics comprise historical data, QoS policies, service level agreements, empirical data, field data, environmental data, and other data pertaining to the operation of the wireless network 10 and collected by the data input subsystem 32.

At step 204, cell 12 resources are individually allocated based on the wireless path characteristics. For the CDMA embodiment, transmission resources 12 are allocated at each cell 12 based on characteristics of the path between the cell 12 and the mobile device 18. In this way, resource allocation is independently controlled at each cell 12 to minimize interference for a soft handoff connection while maintaining the connection at the prescribed link quality. Thus, network managers can efficiently manage air bandwidth and congestion in heavily loaded portions of the network.

In a particular embodiment, as described in more detail below, resources are allocated by dynamically creating a tiered active set based on the active set generated by the mobile device 18. The tiered active set is obtained from the active set by calculating the biases for each cell 12 in the active set and restricting the transmission resources allocated to each cell 12 from the mobile user based on the biases.

Figure 5:
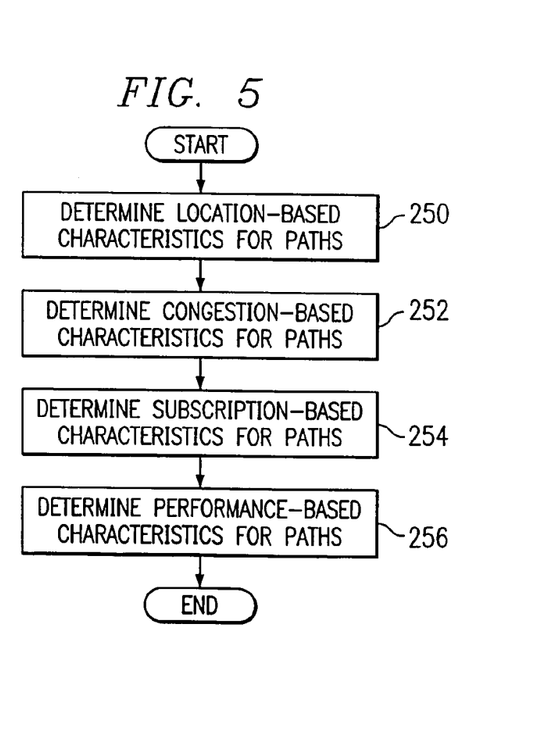
FIG. 5 is a flow diagram illustrating a method for determining path characteristics for a soft handoff connection in accordance with one embodiment of the present invention.

FIG. 5 illustrates a method for determining soft handoff path characteristics for resource allocation in accordance with one embodiment of the present invention. Generally described, characteristics are determined for each path by estimating the air congestion in the cell 12, by using QoS subscriptions, or treatments, of active users and/or applications, by estimating the geo-location of the mobile device 18 and calculating average regular frequency interference estimates based on historical, real-time, and statistical system data, by estimating the cross-pollution effect of neighboring cell 12, and/or by measuring the mobile link performance parameters.

Referring to FIG. 5, the method begins at step 250 in which a location-based characteristic is determined for the soft handoff paths. The location-based characteristic is based on the geographic location of the mobile device 18 relative to the cells 12 and accounts for obstructions and other terrain undulations between the mobile device 18 and the cells 12. This allows cells 12 with negligible contributions to the overall link performance to be identified and resources from the cells 12 to be retained by the cells 12 for later allocation to connections.

Proceeding to step 252, a congestion-based characteristic is determined for the wireless paths. The congestion-based characteristic is based on the available bandwidth (power) at the cells 12 to provide services to new users without violating the subscriber constraints existing at the cell 12. The use of the congestion-based characteristic reduces air congestion in the network 10 and improves system capacity.

At step 254, a subscription-based characteristic is determined for the wireless paths. The subscription-based characteristics include grade of service (GoS), QoS, service level agreement constraints and other suitable subscriptions properties. The subscription-based characteristic allows resources to be allocated to provide link performance proportional to the subscription. Thus, mobile subscribers paying for higher quality link services will be assigned greater resources while subscribers buying lower quality will be assigned minimal resources.

At step 256, a performance-based characteristic is determined for the wireless paths. The performance-based characteristic allows redundancy in resource allocation to be identified and minimized based on real-time performance parameters. Allocations based on location, congestion and subscription characteristics can be refined by the performance-based characteristic that is tied to real-time performance parameters. In this way, resource allocation is controlled to minimize interference between connections while maintaining the subscribed requirements for all users. It will be understood that the link characteristics may be determined from any one of these characteristics or any combination of these characteristics.

Figure 6:
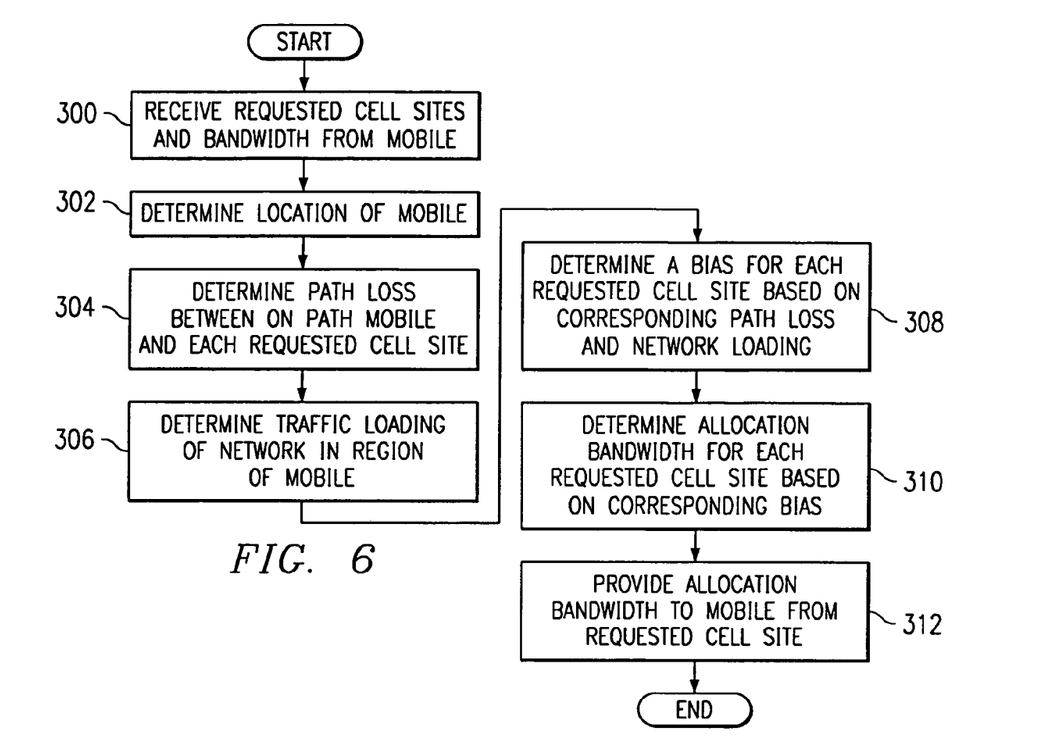
FIG. 6 is a flow diagram illustrating a method for allocating resources soft handoff connections using location-based characteristics in accordance with one embodiment of the present invention.

FIG. 6 is a flow diagram illustrating a method for allocating resources for soft handoff connections using location-based characteristics in accordance with one embodiment of the present invention. The method begins at step 300 in which a requested set of cells 12 and a requested bandwidth is received from the mobile device 18. As previously described, the requested set of cells 12 comprises an active set identified by the mobile device 18 upon initiation of a connection to the wireless network 10.

Proceeding to step 302, the geo-location of the mobile device 18 is determined. The location of the mobile device 18 is determined using GPS or any other suitable system. At step 304, path loss on the paths between the mobile device 18 and each active cell 12 is determined. The paths may be active or contemplated links. In one embodiment, the path loss is the maximum allowable path loss (MAPL). In this embodiment, the path loss is calculated using Hata's model and terrain and building databases of the data input subsystem 32 and using advanced radio frequency propagation (RF) tools.

Next, at step 306, traffic loading of the network is determined in the region of the mobile device 18. Traffic loading is determined from the distribution of active users in the region and may be obtained from historical, statistical network data collected over a period of time by the data input subsystem 32. Using the location of the mobile device 18 along with the path loss and traffic loading, the minimum resources needed from each site in the active set for the soft handoff connection can be determined.

At step 308, a bias is determined for each active cell 12 based on the corresponding path loss, network loading and geo-location of the mobile device 18. At step 310, the allocation bandwidth for each active cell 12 is determined based on the corresponding bias. In one embodiment, the allocation bandwidth is the requested bandwidth multiplied by the bias. In this embodiment, the bias of each cell 12 represents the fraction of the requested bandwidth that will be allocated. It will be understood that allocation bandwidth may be determined using location-based and other characteristics independently of the requested bandwidth from the mobile device.

Applying the bias values to the active set generates a tiered active set of cell 12 for resource allocation. The tiered active set includes the cells 12 of the active set with the bandwidth for each site individually and/or independently adjusted based on the location of the mobile device 18. Accordingly, the full requested bandwidth may be allocated, none of the requested bandwidth may be allocated, in which case the cell 12 does not communicate with the mobile device 18, or a portion of the bandwidth may be allocated to provide only the resources necessary to communicate with a device 18 given its current location.

At step 312, the allocation bandwidth is provided to the mobile device 18 from the active cells 12. The provided allocation bandwidth is the tiered active set including the cells 12 of the active set with their bandwidth adjusted based on the location of the mobile device 18. Step 312 leads to the end of the process by which minimum resources needed from each cell 12 in an active set to meet subscription requirements of the mobile user are determined and allocated.

Figure 7:
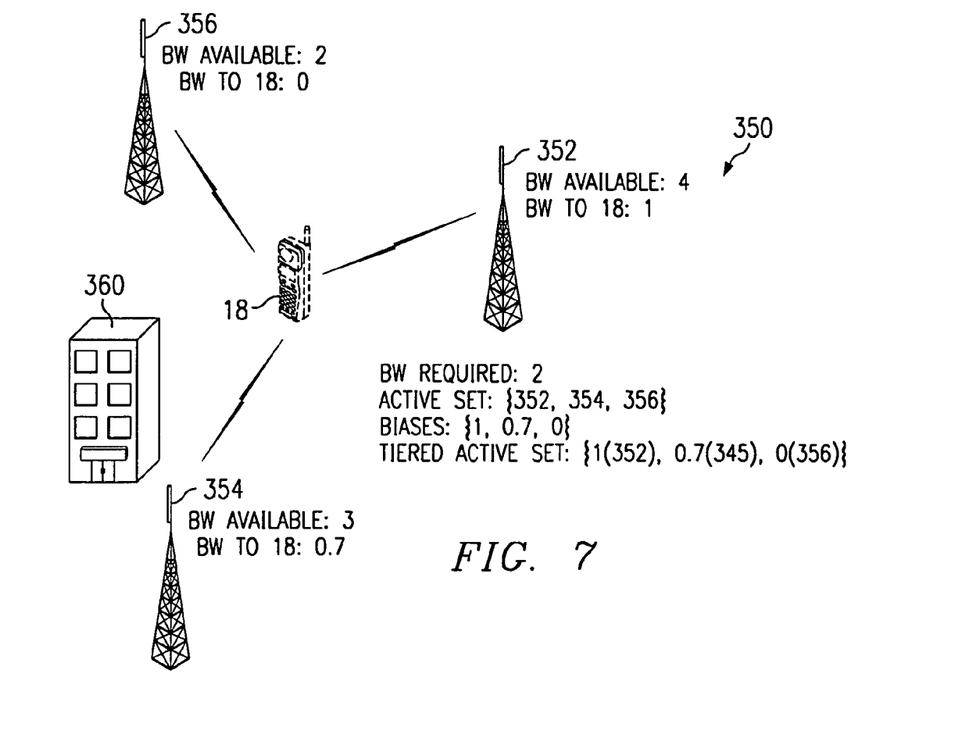
FIG. 7 is a graphical diagram illustrating a location-based soft handoff system for the network of FIG. 1 in accordance with one embodiment of the present invention.

FIG. 7 illustrates a location-based soft handoff system in accordance with one embodiment of the present invention. In this embodiment, soft handoff configuration 350 includes servers 352, 354, and 356, which have 4, 3, and 2 units of bandwidth available, respectively, for allocation to mobile users.

Referring to FIG. 7, mobile unit 18 is in soft handoff with servers 352, 354, and 356, and has an active set of {352, 354, 356}. The mobile unit 18 requires a bandwidth of 2 units from each server in its active set, which would exhaust the current available bandwidth of server 356, leaving it unable to provide service to new users.

As illustrated, the nearest server to mobile unit 18 is server 354. However, because of the obstruction 360 in the signal path and other terrain undulations, server 354 is not the optimal server for mobile unit 18. Instead, server 352 is better situated to communicate with mobile unit 18. Server 356 is located at a relatively greater distance to mobile unit 18 than is server 352, and therefore, server 356 is not the optimal server for mobile unit 18.

Using the empirical formula for path loss and the distribution of the active users in the system, the biases for mobile unit 18 are evaluated to be {1.0, 0.7, 0.0}. Therefore, the tiered active set for mobile unit 18 is {1.0*2, 0.7*2, 0*2}, or {2, 1.4, 0}. That is, mobile unit 18 is allocated 2 units of bandwidth from server 352, 1.4 units of bandwidth from server 354, and 0 units of bandwidth from server 356. As server 356 is geo-located at a relatively large distance from mobile unit 18, its contribution to the overall link performance of the wireless link is negligible and is therefore assigned a bias of 0.

Thus, servers 352, 354, and 356 still have 2, 1.6, and 1 units of bandwidth, respectively, available for allocation to other mobile units in their coverage areas. Without such controlled bandwidth allocation, after allocation of resources in accordance with the unbiased active set of mobile unit 18, {2, 2, 2}, only 2 and 1 units would remain available at servers 352 and 354 respectively. Server 356 would have completely depleted its available bandwidth and would have to deny access to new users.

Figure 8:
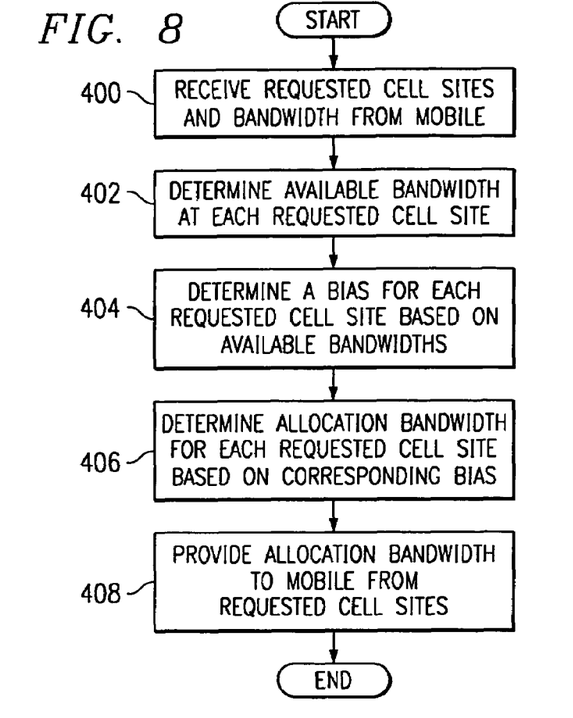
FIG. 8 is a flow diagram illustrating a method for allocating resources for soft handoff connections using congestion-based characteristics in accordance with one embodiment of the present invention.

FIG. 8 is a flow diagram illustrating a method for allocating resources for soft handoff using a congestion-based characteristic in accordance with one embodiment of the present invention. The method begins at step 400 in which a request for a set of cells 12 and for a bandwidth is received from the mobile device 18. As previously described, the requested cells 12 comprise an active set identified by the mobile device 18 upon initiation of the connection to the wireless network 10.

Proceeding to step 402, available bandwidth is determined at each cell 12 in the active set. In one embodiment, the available resources in each cell 12 is determined by measuring and/or estimating the total and current transmit power, or bandwidth, at each of the cells 12 and subtracting the current transmit power from the total transmit power.

At step 404, a bias is determined for each cell 12 based on the corresponding available bandwidth. In a particular embodiment, the biases for the cells 12 are determined by calculating bandwidths required for increasing larger cell sets to maintain the soft handoff connection. Due to diversity gain, the required bandwidth for the connection will decrease as the number of participating cells increase. Thus, based on bandwidth availability, a single site 12 may be able to maintain the link. If no single site has sufficient available bandwidth, it is determined whether any two cells 12 have sufficient bandwidth for a dual cell connection. Similarly, if no two cells 12 have sufficient bandwidth, it is determined whether any three sites have sufficient bandwidth for a tri-cell connection, and so on, until either sufficient bandwidth is determined to be available for the session at a set of the active sites or sufficient bandwidth is unavailable, in which case the connection is not accepted until bandwidth becomes available. Upon determining a set of cells with sufficiently available bandwidth, the bias for those cells is set to "1" for full connectivity as requested by the mobile device 18 while the remaining members of the active sets have a bias value set to "0".

At step 406, the allocation bandwidth is determined for each cell 12 based on the corresponding bias. As previously described, the allocation bandwidth may be the requested bandwidth multiplied by the bias. For a bias value of "1", the allocation bandwidth will be that requested by the mobile device. For a bias of "0", no bandwidth from the cell 12 will be allocated. Applying the bias values to the active set generates a tiered active set of cells 12 for resource allocation. The tiered active set includes the cells 12 of the active set with the bandwidth for each site individually and/or independently adjusted based on real-time air congestion.

At step 408, the allocation bandwidth is provided to the mobile device 18 from the active cells 12. The provided allocation bandwidth is the tiered active set including the cells 12 of the active set with their bandwidth adjusted based on congestion in the network 10. Step 408 leads to the end of the process by which the number of cells 12 participating in the soft handoff connection are minimized.

Figure 9:
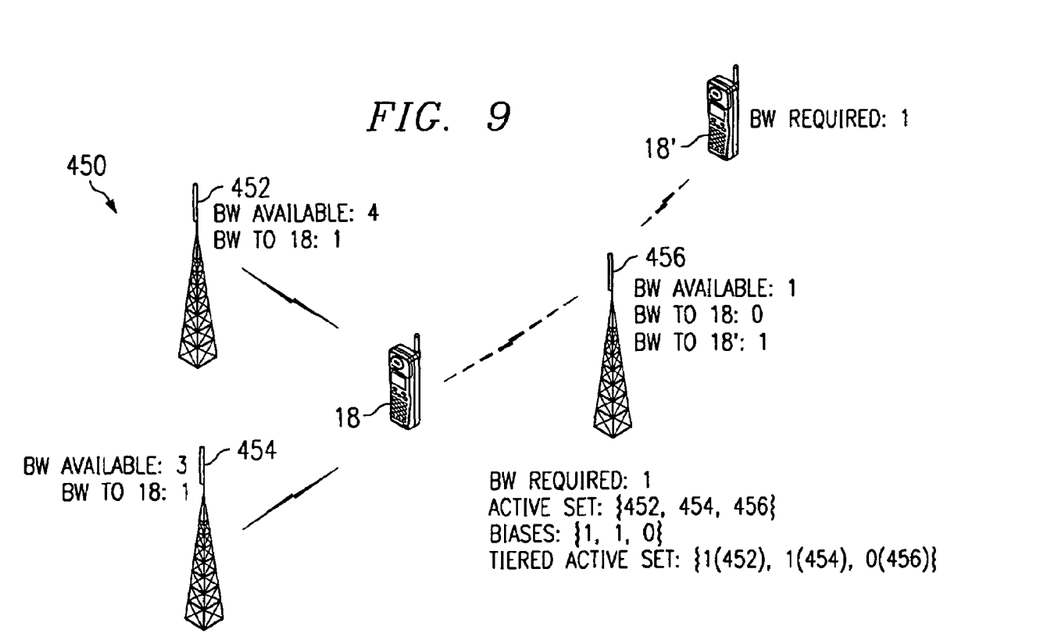
FIG. 9 is a graphical diagram illustrating a congestion-based soft handoff system for the network of FIG. 1 in accordance with one embodiment of the present invention.

FIG. 9 illustrates a congestion-based soft handoff system in accordance with one embodiment of the present invention. In this embodiment, soft handoff configuration 450 includes servers 452, 454, and 456, which have 4, 3, and 1 units of bandwidth available, respectively, for allocation to mobile users.

Referring to FIG. 9, mobile unit 18 is in soft handoff with servers 452, 454, and 456, and has an active set of {452, 454, 456}. The mobile unit 18 requires a bandwidth of 1 unit from each server in its active set, which would exhaust the current available bandwidth of server 456, leaving it unable to provide service to new users, such as mobile unit 18'.

As illustrated, at any instant, each server is transmitting power to the active users in its coverage area, and to the users that are in the soft handoff region of the server. By estimating the total transmit power at each site, the bandwidth available at that server can be estimated such that service may be provided to new users without violating the grade of service and QoS constraints at the server. Such estimates of the available bandwidth can be used to generate the biases in the resource allocation.

Because available bandwidth is a function of total transmit power, the greater the number of servers with which mobile unit 18 is communicating, the less power is required by any particular server. Thus, if the available bandwidth is such that mobile unit 18 can be serviced by fewer servers, without unacceptable degradation of the wireless link, the biases will be selected accordingly. In other words, not all of the servers in the active set of mobile unit 18 will be allocated to communicating with mobile unit 18.

In the illustrated embodiment, the biases for mobile unit 18 are set at {1, 1, 0}. Therefore, the tiered active set for mobile unit 18 becomes {1*1, 1*1, 0*1}. Accordingly, mobile unit 18 is allocated 1 unit of bandwidth from server 452, 1 unit of bandwidth from server 454, and 0 units of bandwidth from server 456.

Thus, servers 452, 454, and 456 still have 3, 2, and 1 units of bandwidth, respectively, available for allocation to other mobile units in their coverage areas. Without such controlled bandwidth allocation, after allocation of resources in accordance with the unbiased active set of mobile unit 18, {1, 1, 1}, server 456 would have completely depleted its available bandwidth and would have to deny access to new users. By selecting the biases in this manner, server 456 preserves its 1 remaining unit of available bandwidth, and may allocate it to mobile unit 18.

Figure 10:
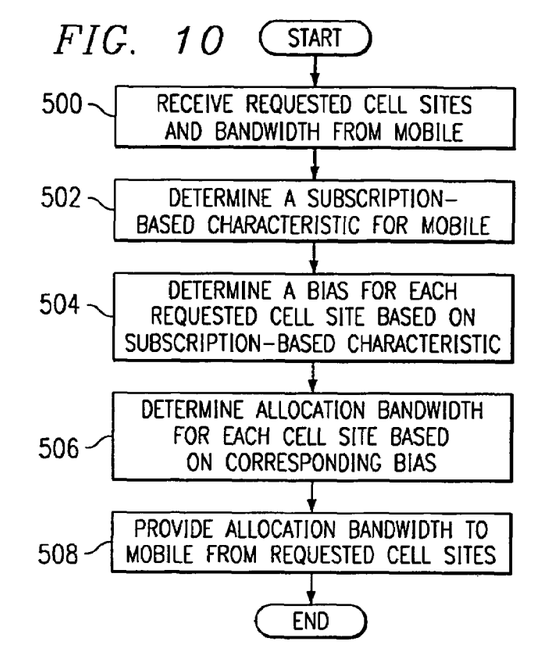
FIG. 10 is a flow diagram illustrating a method for allocating resources for soft handoff connections using subscription-based characteristics in accordance with one embodiment of the present invention.

FIG. 10 is a flow diagram illustrating a method for allocating resources for soft handoff using a subscription-based characteristic in accordance with one embodiment of the present invention. The method begins at step 500 in which a requested set of cells 12 and a bandwidth is received from the mobile device 18. The requested cells 12 comprise an active set that is identified by the mobile device 18 upon initiation of the connection to the wireless network 10.

Proceeding to step 502, a subscription-based characteristic is determined for the mobile connection. The subscription-based characteristic is a grade of service (GoS), QoS or other suitable subscription type agreed to with the user. For the QoS embodiment, the traffic may comprise high quality links for premium users, intermediate quality links for assured users, and lower quality links for best efforts users.

At step 504, a bias is determined for each cell 12 based on the subscription-based characteristic. In one embodiment, a premium subscriber is provided with all cells and bandwidths requested by the mobile device 18. In this embodiment, a best-effort subscriber is provided with only a single cell 12 for communication with the network 10. Assured subscribers are provided with an intermediate subset of the cells 12 requested by the mobile device 18. Thus, bias of "1" will be assigned to all active cells 12 for a premium subscriber and a bias of "1" will be assigned to a single cell 12 for a best-effort user with the remaining cells 12 having a bias of "0". An assured subscriber will have a bias of "0" for one or more of the active cells 12.

At step 506, the allocation bandwidth for each cell 12 is determined based on the corresponding bias. As previously discussed, the allocation bandwidth is requested bandwidth multiplied by the bias. Accordingly, applying the bias value to the active set of cells 12 generates a tiered active set of cells 12 for resource allocation. Cells 12 with a bias "1" will provide the requested bandwidth while cell sites with a bias of "0" will allocate no bandwidth to the mobile device 18.

At step 508, the allocation bandwidth is provided to the mobile device 18 from the cells 12. The provided allocation bandwidth is a tiered active set including the cells of the active set with the bandwidth adjusted based on subscription types of the flows. Step 508 leads to the end of the process by which available resources are fairly distributed amongst users according to their QoS subscription and requirements.

Figure 11:
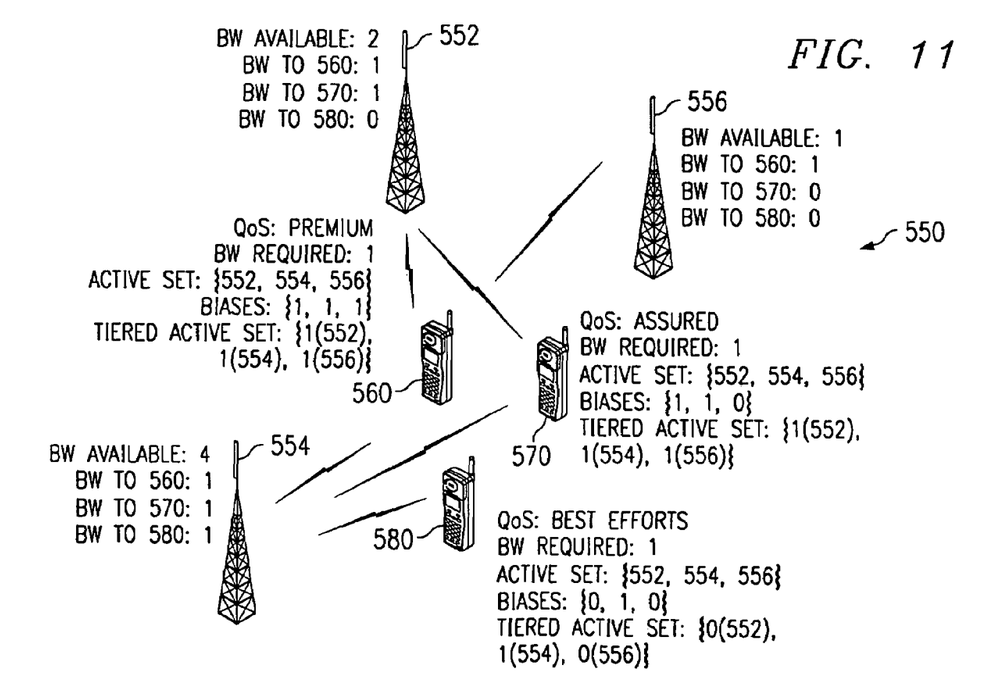
FIG. 11 is a graphical diagram illustrating a subscription-based soft handoff system for the network of FIG. 1 in accordance with one embodiment of the present invention.

FIG. 11 illustrates a subscription-based soft handoff system in accordance with one embodiment of the present invention. In this embodiment, soft handoff configuration 550 includes servers 552, 554, and 556, which have 2, 4, and 1 units of bandwidth available, respectively, for allocation to mobile users.

Referring to FIG. 11, mobile units 560, 570, and 580 are each in soft handoff with servers 552, 554, and 556, and each has an active set of {552, 554, 556}. The mobile unit 560 requires a bandwidth of 1 unit from each server in its active set, which the illustrated embodiment that allocation would exhaust the current available bandwidth of server 556, leaving it unable to provide service to the other mobile units 570 and 580. Furthermore, if the decision as to which mobile unit receives the remaining available bandwidth of server 556 is made on a first-come, first-serve basis, a later-arriving mobile unit will be denied service. This results in unfairness to any users who have subscribed to premium services, but arrive on the network later than lower QoS subscribers. By using a subscription-based soft handoff system, this problem is reduced or eliminated.

As illustrated, users with different QoS subscriptions compete for the same limited resources, the available bandwidth. The different levels of QoS subscriptions are used to allocate resources. With such selection criterion for the delivery mechanism, link performance for the mobile user is proportional to its QoS subscription. A mobile user subscribing to a higher QoS and desiring a high quality link (i.e., premium users) will be assigned a larger share of the available resources. Mobile users requiring lower QoS (i.e., best effort users) will be assigned only minimal resources.

In the illustrated embodiment, mobile user 560 is a premium subscriber, mobile unit 570 is an assured subscriber, and mobile unit 580 is a best effort subscriber. All three mobile units require 1 unit of bandwidth. However, as server 556 has only 1 unit of bandwidth available, depending on which mobile unit requests first, server 556 may allocate the resource to mobile unit 580, even though mobile unit 580 is only a best effort subscriber. Furthermore, mobile units 560 and 570, who have subscribed to higher levels of services will be allocated less resources.

By assigning biases based on the QoS subscription, mobile users are allocated resources in accordance to their subscription class. For example, premium users may be assigned bias values {1, 1, 1}; assured users may be assigned bias values {1, 1, 0}; and, best effort users may be assigned bias values {1, 0, 0}. In the illustrated embodiment, mobile unit 560 is assigned bias values {1, 1, 1}; mobile unit 570 is assigned bias values {1, 1, 0}; and, mobile unit 580 is assigned bias values {0, 1, 0}. Accordingly, mobile unit 560 will have a tiered active set of {1*1, 1*1, 1*1}, and will receive 1 unit of bandwidth from each server 552, 554, and 556. Mobile unit 570 will have a tiered active set of {1*1, 1*1, 0*1} and will receive 1 unit of bandwidth from servers 552 and 554, and 0 units of bandwidth from server 556. Mobile unit 580 will have a tiered active set of {0*1, 1*1, 0*1} and will receive 1 unit of bandwidth from server 554 only, and 0 units of bandwidth from servers 552 and 556.

Thus, mobile units 560, 570, and 580 each receive resources in accordance with their QoS subscriptions. That is, mobile unit 560, a premium user, receives a total of 3 units of bandwidth while mobile user 580, a best effort user, receives only 1 unit of bandwidth. Such an allocation will result in a fair distribution of resources, wherein the user who has subscribed to a higher level of service is provided with more resources than a user who has subscribed to a lower level of service.

Figure 12:
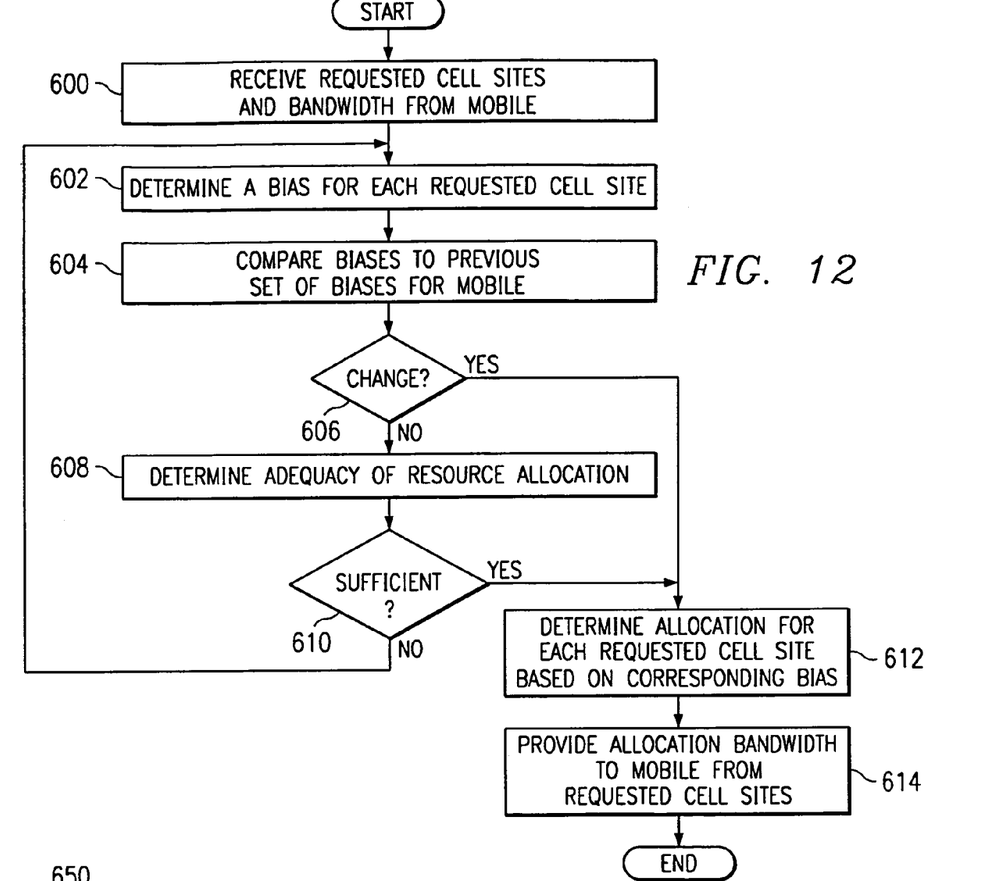
FIG. 12 is a flow diagram illustrating a method for allocating resources for soft handoff connections using performance-based characteristics in accordance with one embodiment of the present invention.

FIG. 12 is a flow diagram illustrating a method for allocating resources for soft handoff connections using a performance-based characteristic in accordance with one embodiment of the present invention. The method begins at step 600 in which a request for a set of cells 12 and a bandwidth level is received from the mobile device 18. At step 602, a bias is determined for each cell 12 based on path characteristics. The path characteristics may be location-based characteristics, congestion-based characteristics, and/or subscription-based characteristics.

Proceeding to step 604, the determined biases are compared to a previous set of biases used to allocate bandwidth under which the mobile device 18 is currently operating. Next, at decisional step 606, the mobile device 18 determines whether the biases have changed form the previous set. If the biases have not changed, the No branch of decisional step 606 leads to step 608 in which the adequacy of current resource allocation is determined. In one embodiment, the adequacy is determined based on whatever an acknowledgement was received and, if no acknowledgement was received, whether a timer has expired in which case insufficient resources were allocated. The acknowledgement may be based on packet error rates, round trip delays and packet retransmissions.

Proceeding to decisional step 610, if sufficient resources are not allocated, the No branch of decisional step 610 returns to step 602 in which the biases are recomputed in order to improve link quality. If sufficient resources have been allocated, the Yes branch of decisional step.610 leads to step 612. The Yes branch of decisional step 606 also leads to step 612 in which allocation for each requested cell 12 is determined by applying on the corresponding biases to generate the tiered active set. At step 614, the allocated bandwidth is provided to the mobile device 18 from the cell 12. Step 614 leads it into the process by which resource allocation is refined dynamically based on real-time performance parameters to minimize the redundancy of resource allocation while maintaining required link quality.

Figure 13:
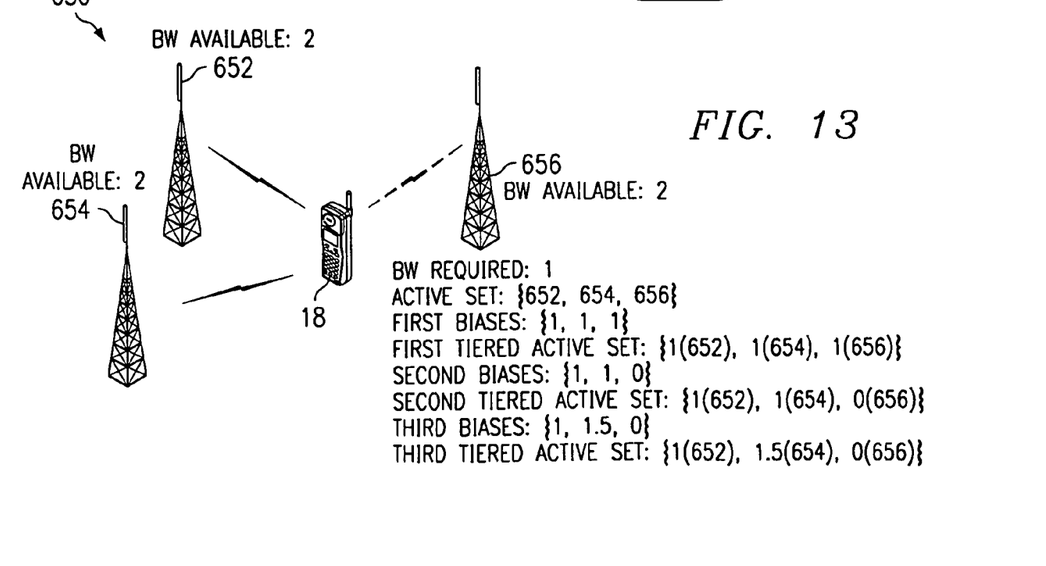
FIG. 13 is a graphical diagram illustrating a performance-based soft handoff system for the network of FIG. 1 in accordance with one embodiment of the present invention.

FIG. 13 illustrates a performance-based soft handoff system in accordance with one embodiment of the present invention. In this embodiment, soft handoff configuration 650 includes servers 652, 654, and 656, which each have 2 units of bandwidth available for allocation to mobile users.

Referring to FIG. 13, mobile unit 18 is in soft handoff with servers 652, 654, and 656, and has an active set of {652, 654, 656}. The mobile unit 18 requires a bandwidth of 1 unit from each server in its active set. By analyzing certain performance parameters collected in real time, unnecessary redundancy in the resource allocation can be estimated and minimized by calculating appropriate biases. This technique is similar to that based on geo-location of the mobile unit, discussed in conjunction with FIGS. 6 and 7 above, except that real time performance parameters are used to estimate the biases. The biases are recalculated at regular intervals and adjusted according to the measured performance of the link. The performance parameters include packet error rates, round trip delays, and packet retransmissions.

In the illustrated embodiment, mobile unit 18 begins with a first set of bias values {1, 1, 1}. It will be understood that the initial bias values may be calculated using any one of the above-mentioned methods, or a combination of the above-mentioned methods. For the duration of the wireless link connection, performance data is collected, consisting of packet error rates, round trip delays, and packet retransmissions. At the next bias recalculation interval, the collected data is used to evaluate the quality of the link.

If the quality of the link is well above acceptable levels, unnecessary redundant resources unallocated to mobile unit 18 by an adjustment in the bias values. The bias adjustment may have the effect of removing servers from communication with mobile unit 18 entirely, partially reducing the bandwidth allocated by a particular server to mobile unit 18, or a combination of the two effects. In the illustrated embodiment, one server, server 656, is removed from communication with mobile unit 18. This is effected by adjusting the bias values for mobile unit 18 to {1, 1, 0}. Thus, the second tiered active set for mobile unit 18 becomes {1*1, 1*1, 0*1}, and mobile unit 18 receives 1 unit of bandwidth from servers 652 and 654, and 0 units of bandwidth from server 656. Performance data is continually collected and at the next bias recalculation interval, the collected data is again used to evaluate the quality of the link.

If the quality of the link has degraded to below acceptable levels, additional resources are allocated to mobile unit 18 to restore acceptable service. Adding resources is effected by an upward adjustment in the bias values, which may have the effect of adding servers to communication with mobile unit 18, increasing the bandwidth allocated by servers already in communication with mobile unit 18, or a combination of the two effects. In the illustrated embodiment, bandwidth from a server already in communication with mobile unit 18 is increased. This is accomplished by adjusting the bias values of mobile unit 18 to {1, 1.5, 0}, and the third tiered active set for mobile unit 18 becomes {1*1, 1.5*1, 0*1}. Thus, mobile unit 18 receives 1 unit of bandwidth from server 652, 1.5 units of bandwidth from server 654, and 0 units of bandwidth from server 656.

As illustrated, the repeated bias modifications ensure that resource allocation is adequate to maintain link quality while minimizing unnecessary redundant resources which may then be allocated to other mobile users.

Although the present invention has been described with several embodiments, various changes and modifications may be suggested to one skilled in the art. It is intended that the present invention encompass such changes and modifications as fall within the scope of the appended claims.

What is claimed is:

1. A method for allocating one or more resources in a wireless network, comprising:
   receiving from a mobile device a request for a set of cells, the mobile device operable to communicate information over a wireless link, each cell associated with a bandwidth;
   estimating an available bandwidth for each cell of the set of cells;
   determining whether there is an assignment of a bias for each cell that is operable to maintain the wireless link, the bias for a cell indicating a portion of the bandwidth of the cell to be allocated to the wireless link, the bias for a cell determined in accordance with the available bandwidth for the cell;
   establishing a resource allocation for each cell in accordance with the bias for the each cell if there is an assignment of a bias for each cell that is operable to maintain the link; and
   accepting a connection for the mobile device even if there is no resource allocation for one cell of the set of cells that is operable to maintain the wireless link.

2. The method of claim 1, wherein the set of cells comprises one or more cells identified by the mobile device as active.

3. The method of claim 1, wherein estimating the available bandwidth for each cell of the set of cells further comprises repeating the following for each cell of the set of cells:
   establishing a total transmit power of a cell;
   estimating a current transmit power of the cell; and
   calculating a difference between the total transmit power and the current transmit power to estimate the available bandwidth for the cell.

4. The method of claim 1, wherein determining whether there is an assignment of a bias for each cell that is operable to maintain the wireless link further comprises:

associating a first bias to a first cell having a first available bandwidth; and associating a second bias to a second cell having a second available bandwidth, the second bias greater than the first bias, the second available bandwidth larger than the first available bandwidth, a greater bias indicating a larger portion of bandwidth to be allocated.

5. The method of claim 1, wherein determining whether there is an assignment of a bias for each cell that is operable to maintain the wireless link further comprises:

selecting a cell from the set of cells as a member of a set of selected cells; and repeating the following until at least one of the following occurs: an assignment of a bias for each cell that is operable to maintain the link is determined, and a last cell of the set of cells is reached:

determining that there is an assignment of a bias for each cell that is operable to maintain the wireless link if there is an assignment of a bias for each cell of the set of selected cells that is operable to maintain the wireless link; and otherwise, selecting a next cell from the set of cells as a member of the set of selected cells.

6. The method of claim 1, wherein establishing the resource allocation for each cell in accordance with the bias for the each cell further comprises repeating the following for each cell of the set of cells:

weighting the bandwidth of the cell according to the bias for the cell.

7. The method of claim 1, further comprising rejecting a connection for the mobile device if there is no assignment of a bias for each cell that is operable to maintain the wireless link.

8. A system for allocating one or more resources in a wireless network, comprising:

an interface operable to receive from a mobile device a request for a set of cells, the mobile device operable to communicate information over a wireless link, each cell associated with a bandwidth; and one or more subsystems coupled to the interface and operable to:

estimate an available bandwidth for each cell of the set of cells;

determine whether there is an assignment of a bias for each cell that is operable to maintain the wireless link, the bias for a cell indicating a portion of the bandwidth of the cell to be allocated to the wireless link, the bias for a cell determined in accordance with the available bandwidth for the cell;

establish a resource allocation for each cell in accordance with the bias for the each cell if there is an assignment of a bias for each cell that is operable to maintain the link; and accept a connection for the mobile device even if there is no resource allocation for one cell of the set of cells that is operable to maintain the wireless link.

9. The system of claim 8, wherein the set of cells comprises one or more cells identified by the mobile device as active.

10. The system of claim 8, the one or more subsystems further operable to estimate the available bandwidth for each cell of the set of cells by repeating the following for each cell of the set of cells:

establishing a total transmit power of a cell;

estimating a current transmit power of the cell; and calculating a difference between the total transmit power and the current transmit power to estimate the available bandwidth for the cell.

11. The system of claim 8, the one or more subsystems further operable to determine whether there is an assignment of a bias for each cell that is operable to maintain the wireless link by:

associating a first bias to a first cell having a first available bandwidth; and associating a second bias to a second cell having a second available bandwidth, the second bias greater than the first bias, the second available bandwidth larger than the first available bandwidth, a greater bias indicating a larger portion of bandwidth to be allocated.

12. The system of claim 8, the one or more subsystems further operable to determine whether there is an assignment of a bias for each cell that is operable to maintain the wireless link by:

selecting a cell from the set of cells as a member of a set of selected cells; and repeating the following until at least one of the following occurs: an assignment of a bias for each cell that is operable to maintain the link is determined, and a last cell of the set of cells is reached:

determining that there is an assignment of a bias for each cell that is operable to maintain the wireless link if there is an assignment of a bias for each cell of the set of selected cells that is operable to maintain the wireless link; and otherwise, selecting a next cell from the set of cells as a member of the set of selected cells.

13. The system of claim 8, the one or more subsystems further operable to establish the resource allocation for each cell in accordance with the bias for the each cell by repeating the following for each cell of the set of cells:

weighting the bandwidth of the cell according to the bias for the cell.

14. The system of claim 8, the one or more subsystems further operable to reject a connection for the mobile device if there is no assignment of a bias for each cell that is operable to maintain the wireless link.

15. A computer-readable medium encoded with a computer program to perform a method for allocating one or more resources in a wireless network, the method comprising:

receiving from a mobile device a request for a set of cells, the mobile device operable to communicate information over a wireless link, each cell associated with a bandwidth;

estimating an available bandwidth for each cell of the set of cells;

determining whether there is an assignment of a bias for each cell that is operable to maintain the wireless link, the bias for a cell indicating a portion of the bandwidth of the cell to be allocated to the wireless link, the bias for a cell determined in accordance with the available bandwidth for the cell;

establishing a resource allocation for each cell in accordance with the bias for the each cell if there is an assignment of a bias for each cell that is operable to maintain the link; and accepting a connection for the mobile device even if there is no resource allocation for one cell of the set of cells that is operable to maintain the wireless link.

16. The method of claim 15, wherein the set of cells comprises one or more cells identified by the mobile device as active.

17. The method of claim 15, further comprising estimating the available bandwidth for each cell of the set of cells by repeating the following for each cell of the set of cells:
establishing a total transmit power of a cell;
estimating a current transmit power of the cell; and
calculating a difference between the total transmit power and the current transmit power to estimate the available bandwidth for the cell.

18. The method of claim 15, further comprising determining whether there is an assignment of a bias for each cell that is operable to maintain the wireless link by:
associating a first bias to a first cell having a first available bandwidth; and
associating a second bias to a second cell having a second available bandwidth, the second bias greater than the first bias, the second available bandwidth larger than the first available bandwidth, a greater bias indicating a larger portion of bandwidth to be allocated.

19. The method of claim 15, further comprising determining whether there is an assignment of a bias for each cell that is operable to maintain the wireless link by:
selecting a cell from the set of cells as a member of a set of selected cells; and
repeating the following until at least one of the following occurs: an assignment of a bias for each cell that is operable to maintain the link is determined, and a last cell of the set of cells is reached:
determining that there is an assignment of a bias for each cell that is operable to maintain the wireless link if there is an assignment of a bias for each cell of the set of selected cells that is operable to maintain the wireless link; and
otherwise, selecting a next cell from the set of cells as a member of the set of selected cells.

20. The method of claim 15, further comprising establishing the resource allocation for each cell in accordance with the bias for the each cell by repeating the following for each cell of the set of cells:
weighting the bandwidth of the cell according to the bias for the cell.

21. The method of claim 15, further comprising rejecting a connection for the mobile device if there is no assignment of a bias for each cell that is operable to maintain the wireless link.

22. A system for allocating one or more resources in a wireless network, comprising:
means for receiving from a mobile device a request for a set of cells, the mobile device operable to communicate information over a wireless link, each cell associated with a bandwidth;
means for estimating an available bandwidth for each cell of the set of cells;
means for determining whether there is an assignment of a bias for each cell that is operable to maintain the wireless link, the bias for a cell indicating a portion of the bandwidth of the cell to be allocated to the wireless link, the bias for a cell determined in accordance with the available bandwidth for the cell;
means for establishing a resource allocation for each cell in accordance with the bias for the each cell if there is an assignment of a bias for each cell that is operable to maintain the link; and
means for accepting a connection for the mobile device even if there is no resource allocation for one cell of the set of cells that is operable to maintain the wireless link.

23. A method for allocating one or more resources in a wireless network, comprising:
receiving from a mobile device a request for a set of cells, the mobile device operable to communicate information over a wireless link, the set of cells comprising one or more cells identified by the mobile device as active, each cell associated with a bandwidth;
estimating an available bandwidth for each cell of the set of cells by repeating the following for each cell of the set of cells:
establishing a total transmit power of a cell;
estimating a current transmit power of the cell; and
calculating a difference between the total transmit power and the current transmit power to estimate the available bandwidth for the cell;
determining whether there is an assignment of a bias for each cell that is operable to maintain the wireless link, the bias for a cell indicating a portion of the bandwidth of the cell to be allocated to the wireless link, the bias for a cell determined in accordance with the available bandwidth for the cell by:
selecting a cell from the set of cells as a member of a set of selected cells; and
repeating the following until at least one of the following occurs: an assignment of a bias for each cell that is operable to maintain the link is determined, and a last cell of the set of cells is reached:
determining that there is an assignment of a bias for each cell that is operable to maintain the wireless link if there is an assignment of a bias for each cell of the set of selected cells that is operable to maintain the wireless link; and
otherwise, selecting a next cell from the set of cells as a member of the set of selected cells, the determination further made by:
associating a first bias to a first cell having a first available bandwidth; and
associating a second bias to a second cell having a second available bandwidth, the second bias greater than the first bias, the second available bandwidth larger than the first available bandwidth, a greater bias indicating a larger portion of bandwidth to be allocated;
establishing a resource allocation for each cell in accordance with the bias for the each cell if there is an assignment of a bias for each cell that is operable to maintain the link, establishing the resource allocation further comprising repeating the following for each cell of the set of cells:
weighting the bandwidth of the cell according to the bias for the cell;
accepting a connection for the mobile device even if there is no resource allocation for one cell of the set of cells that is operable to maintain the wireless link; and
rejecting a connection for the mobile device if there is no assignment of a bias for each cell that is operable to maintain the wireless link.

* * * * *